United States Patent
Ward

(10) Patent No.: US 12,552,518 B2
(45) Date of Patent: Feb. 17, 2026

(54) MODIFICATION OF AIRCRAFT FOR PARABOLIC FLIGHT

(71) Applicant: MU-G Technologies, LLC, Titusville, FL (US)

(72) Inventor: Robert Scott Ward, Titusville, FL (US)

(73) Assignee: MU-G TECHNOLOGIES, LLC, Titusville, FL (US)

( * ) Notice: Subject to any disclaimer, the term of this patent is extended or adjusted under 35 U.S.C. 154(b) by 254 days.

(21) Appl. No.: 18/326,133

(22) Filed: May 31, 2023

(65) Prior Publication Data

US 2023/0391446 A1 Dec. 7, 2023

Related U.S. Application Data

(60) Provisional application No. 63/365,663, filed on Jun. 1, 2022.

(51) Int. Cl.
*B64C 13/40* (2006.01)
*F15B 21/00* (2006.01)

(52) U.S. Cl.
CPC ............ *B64C 13/40* (2013.01); *F15B 21/006* (2013.01)

(58) Field of Classification Search
CPC .. B64C 13/40; F15B 1/02; F15B 1/265; F15B 21/006; F15B 21/047; F15B 2201/31; F15B 2211/615; F15B 2211/625; F15B 2211/8609
See application file for complete search history.

(56) References Cited

U.S. PATENT DOCUMENTS

| | | | | |
|---|---|---|---|---|
| 4,215,844 A | * | 8/1980 | Bowen | F15B 1/02 91/20 |
| 4,664,155 A | * | 5/1987 | Archung | B64F 1/28 244/99.6 |
| 5,971,319 A | * | 10/1999 | Lichtenberg | F15B 21/006 244/99.6 |
| 8,833,695 B2 | * | 9/2014 | Dhuri | F15B 21/044 137/12 |
| 9,656,756 B2 | * | 5/2017 | Atkey | F02C 7/32 |
| 2013/0298542 A1 | * | 11/2013 | Lowman | F15B 15/18 137/511 |

FOREIGN PATENT DOCUMENTS

GB 2586790 A * 3/2021 ............ F15B 21/041

* cited by examiner

*Primary Examiner* — Jesse S Bogue
(74) *Attorney, Agent, or Firm* — Kelly G. Swartz; Widerman Malek, PL

(57) ABSTRACT

A hydraulic system for use during reduced gravity flight including: a reservoir; a hydraulic device; a supply line providing fluid communication between the reservoir and the hydraulic device; a return line providing fluid communication between the hydraulic device and the reservoir; a supply valve located on the supply line between the reservoir and the hydraulic device and selectively configurable in an open or closed position; and a return valve located on the return line between the reservoir and the hydraulic device and selectively configurable in an open or closed position; and wherein the supply valve is adapted to prevent fluid communication between the reservoir and the hydraulic device when in the supply valve closed position; and wherein the return valve is adapted to prevent fluid communication between the reservoir and the hydraulic device when in the return valve closed position.

13 Claims, 1 Drawing Sheet

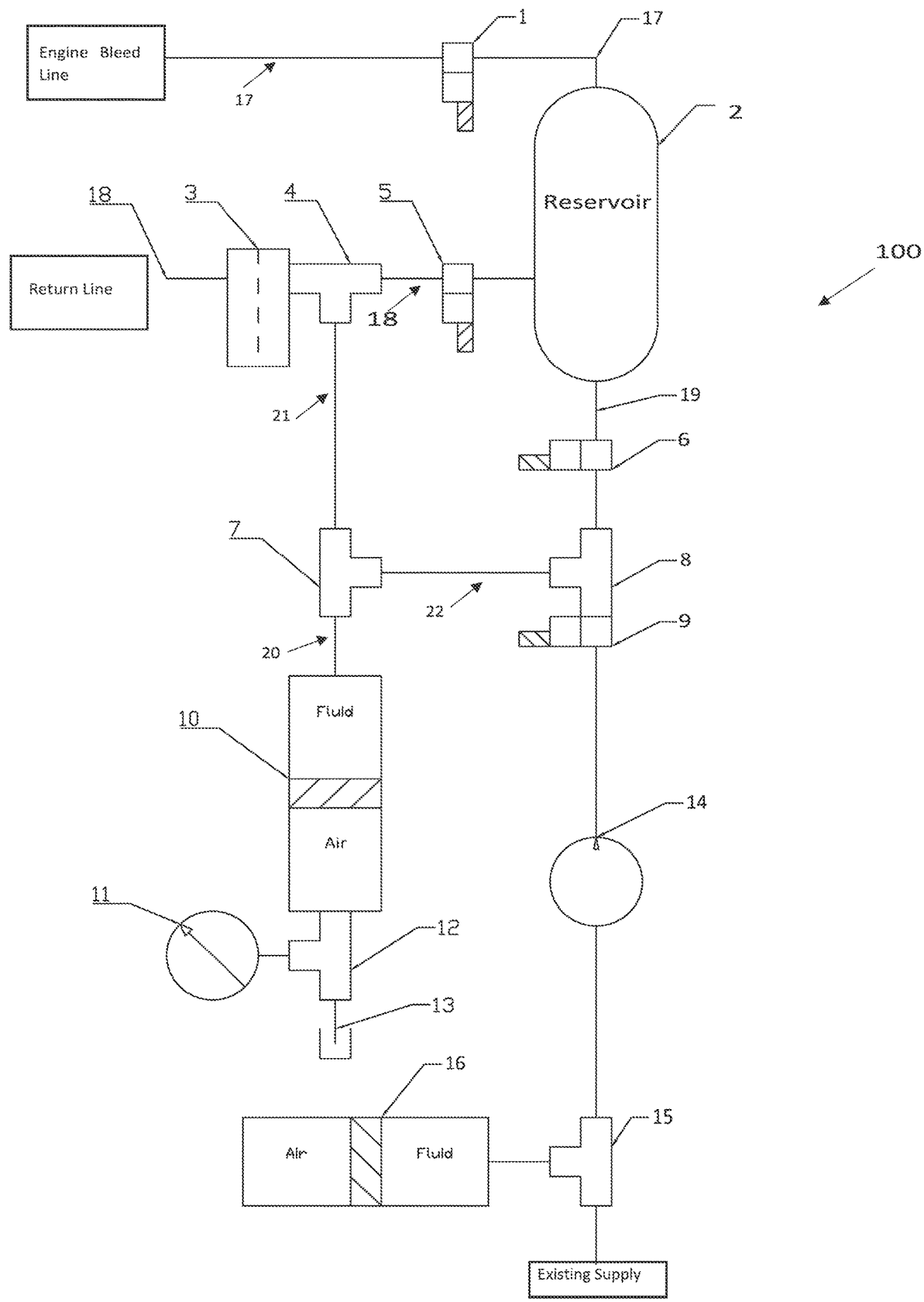

MODIFICATION OF AIRCRAFT FOR PARABOLIC FLIGHT

RELATED APPLICATIONS

This application claims priority under 35 U.S.C. § 119(e) of U.S. Provisional Patent Application Ser. No. 63/365,663 filed on Jun. 1, 2022 and titled MODIFICATION OF AIRCRAFT FOR PARABOLIC FLIGHT. The content of this application is incorporated herein by reference.

FIELD OF THE INVENTION

The present invention relates to a hydraulic system used on an aircraft during parabolic flight.

BACKGROUND OF THE INVENTION

In a typical hydraulic system used on a commercial aircraft, a reservoir is employed to supply fluid to the hydraulic pumps and provide capability for varying hydraulic fluid demands of the aircraft's flight controls and other hydraulically operated systems such as the aircraft's landing gear. A typical hydraulic reservoir is not completely filled with hydraulic fluid. The space in the reservoir not filled by hydraulic fluid is nominally filled with ambient air. At standard operating altitudes of a commercial aircraft (25,000 to 35,000 feet) the atmospheric pressure is significantly less than at sea level and bleed air from the engine is injected into the reservoir to pressurize the hydraulic reservoir. This pressurization pushes air molecules into the hydraulic fluid and makes it less dense, or spongy. Because the fluid is super-saturated with air, the bulk modulus of the fluid (a measure of the fluid's resistance to compression) is reduced, affecting the performance of the flight control actuators that use the hydraulic system.

This problem is especially pronounced during reduced-gravity, or parabolic flight. In this situation, the hydraulic fluid and air in the reservoir sloshes around as the less-dense air naturally moves to the center of the cavity of the hydraulic reservoir while the denser hydraulic fluid moves to the outside walls of the reservoir. This is further exacerbated by the hydrophilic interaction between the hydraulic fluid and the metallic walls of the reservoir. This process allows the hydraulic fluid to interact with the bleed air line at the top of the reservoir. The bleed air line supplies engine bleed air at 30-45 PSI to pressurize the hydraulic reservoir. During reduced-gravity flight, the air introduced into the hydraulic fluid significantly increases the amount of foaming of the hydraulic fluid. Additionally, during reduced-gravity flight, there is a possibility for brief periods of negative-g conditions, however short or insignificant, that will create an inversion of the hydraulic fluid and air mixture ensuring that the hydraulic fluid interacts with the bleed air line at the top of the hydraulic reservoir, further contributing to the foaming process.

The foaming of the hydraulic fluid creates a condition where the hydraulic pumps could possibly cavitate (loss of hydraulic output pressure) and cause a loss of hydraulically boosted flight controls.

While aircraft may be designed maintain control with a loss of one or more hydraulically boosted control, operating an aircraft with this possibility prevents an acceptable level of safety during flights with reduced-gravity operations.

Previous hydraulic system modifications have bypassed the reservoir with a pair of hydraulic accumulators and a series of valves to prevent the introduction of the foamed hydraulic fluid into the system while maintaining supply and return to the hydraulic system, however they did not mitigate for the interaction of the hydraulic fluid with the bleed air line during the reduced gravity maneuvers and therefore the hydraulic fluid in the reservoir is "foamed" when re-introduced into the hydraulic system during the period of flight between the reduced-gravity maneuvers and landing.

Therefore, in order to obtain approval to operate a large commercial turbine-powered aircraft for parabolic flight and create acceptable safety conditions, it is necessary to devise a system that will prevent foaming of the hydraulic fluid during reduced-gravity maneuvers.

SUMMARY OF THE INVENTION

With the above in mind, embodiments of the present invention are related to a hydraulic system for use during reduced gravity flight. The system may include a reservoir, a hydraulic device, a supply line, a return line, a supply valve, and a return valve.

The supply line may be adapted to provide fluid communication between the reservoir and the hydraulic device.

The return line may be adapted to provide fluid communication between the hydraulic device and the reservoir.

The supply valve may be located on the supply line between the reservoir and the hydraulic device and selectively configurable in a supply valve open position or a supply valve closed position. The supply valve may be adapted to prevent fluid communication between the reservoir and the hydraulic device when in the supply valve closed position.

The return valve may be located on the return line between the reservoir and the hydraulic device and selectively configurable in a return valve open position or a return valve closed position. The return valve may be adapted to prevent fluid communication between the reservoir and the hydraulic device when in the return valve closed position.

The system may further include a bleed air line and a bleed valve.

The bleed air line may be adapted to provide fluid communication between an engine bleed line and the reservoir.

The bleed valve may be located on the bleed air line between the reservoir and the engine bleed line and selectively configurable in a bleed valve open position or a bleed valve closed position. The bleed valve may be adapted to prevent fluid communication between the reservoir and the engine bleed line when in the bleed valve closed position.

The system may still further include a second supply line in fluid communication with the return line and the supply line. The second supply line may not be in fluid communication with the reservoir when the return valve is in the return valve closed position. The second supply line may not be in fluid communication with the reservoir when the supply valve is in the supply valve closed position.

The system may further include a first accumulator in fluid communication with the supply line and a second accumulator in fluid communication with the second supply line.

The system may further include a shutoff valve positioned on the supply line between the first accumulator and the supply valve and also positioned between the second supply line and the first accumulator.

The system may further include a return extension line and a supply extension line. The return extension line may be in fluid communication with the return line and the second supply line. The supply extension line may be in fluid communication with the supply line and the second supply line.

The system may further include first, second, and third connectors. The first connector may be configured to place the return line in fluid communication with the return extension line. The second connector may be configured to place the supply line in fluid communication with the supply extension line. The third connector may be configured to place the return extension line, supply extension line, and second supply line in fluid communication.

BRIEF DESCRIPTION OF THE DRAWINGS

Some embodiments of the present invention are illustrated as an example and are not limited by the FIGURES of the accompanying drawings, in which like references may indicate similar elements.

FIG. 1 is a schematic diagram of a hydraulic system in accordance with an embodiment of the present invention.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a hydraulic system for reduced-gravity flight 100. This system 100 allows for proper operation of hydraulic systems during and after reduced-gravity or parabolic flight by virtue of a series of valves, tubing, connectors and accumulators to shut off the bleed airline to the hydraulic reservoir and bypass the returning hydraulic fluid around the reservoir(s). This system 100 maintains a closed volume, preventing air mixing with the hydraulic fluid during reduced gravity operations because introduction of air into the hydraulic fluid causes foaming in the reservoir, and subsequent foaming of the hydraulic pumps, which may prevent proper operation of the hydraulic systems.

FIG. 1 is a schematic view of the hydraulic system for reduced gravity flight in accordance with an embodiment of the present invention. Those with skill in the art will know that the hydraulic system for reduced gravity flight 100 of FIG. 1 may be achieved through modifying an aircraft's existing hydraulic system. As depicted in FIG. 1, hydraulic fluid is carried within the system 100. The return line 18, return filter 3, hydraulic reservoir 2, hydraulic device 14, supply line 19, and bleed air line 17 may exist in known aircraft hydraulic systems.

Under normal gravity conditions, hydraulic fluid from return lines 18 may flow through a return filter 3 into a hydraulic reservoir 2 to accommodate volume changes in the fluid as hydraulic devices are activated. Hydraulic fluid may flow from the reservoir 2 to one or more hydraulic device 14 through supply lines 19. The hydraulic devices 14 may include, by way of example, and not as a limitation, hydraulic pumps. The reservoir 2 may be pressurized using a bleed air line 17.

The inventive system 100 introduces valves 1, 5, and 6 to the existing system. Specifically, one of the valves, 1, 5, and 6 may be disposed within the path of each connection to the reservoir 2.

The bleed valve 1 may be disposed on the bleed air line 17. The bleed valve 1 may be positioned in either a closed or open position. In the open position, the bleed valve 1 may allow fluid communication between the bleed air line 17 and the reservoir 2. In the closed position, the bleed valve 1 may prevent fluid communication between the bleed air line 17 and the reservoir 2.

The return valve 5 may be disposed on the return line 18. The return valve 5 may be positioned in either a closed or open position. In the open position, the return valve 5 may allow fluid communication between the return line 18 and the reservoir 2. In the closed position, the return valve 5 may prevent fluid communication between the return line and the reservoir 2.

The supply valve 6 may be disposed on the supply line 19. The supply valve 6 may be positioned in either a closed or open position. In the open position, the supply valve 6 may allow fluid communication between the supply line 19 and the reservoir 2. The supply valve 6 may be positioned on the supply line between the reservoir 2 and a shutoff valve 9, which may be present in the known system. The known shutoff valve may be inline with the supply line 19 between one or more hydraulic devices 14 and the reservoir 2.

In some embodiments, the known hydraulic system may include a first accumulator 16. In embodiments including a first accumulator 16, the first accumulator 16 may be installed downstream of the hydraulic devices 14, as depicted in FIG. 1. The first accumulator 16 may be place with fluid communication with the supply line 19 by using a fifth "T" connector 15.

In the hydraulic system for reduced gravity flight 100, one or more additional accumulators 10 may be coupled into the system as shown in FIG. 1. The additional accumulator 10 may be coupled in parallel to the existing supply line 19 through the use of three "T" connectors 4, 7, and 8. A first "T" connector 4 may be installed on the return line 18 between the return filter 3 and the return valve 5. The return valve 5 may be positioned on the return line 18 between the first "T" connector 4 and the reservoir 2. The first "T" connector 4 may place the return line 18 in fluid communication with the return extension line 21. A second "T" connector 8 may be installed on the supply line 19 between the hydraulic device 14 and the supply valve 6. The supply valve 6 may be positioned on the supply line 19 between the second "T" connector 4 and the reservoir 2. The second "T" connector 8 may place the supply line 19 in fluid communication with the supply extension line 22. A third "T" connector 7 may be installed to place the return extension line 21 in fluid communication with the supply extension line 22. The remaining junction of the third "T" connector 7 may place both the return extension line 21 and the supply extension line 22 in fluid communication with a second supply line 20. The second supply line 20 may be in fluid communication with the additional accumulator 10.

One with skill in the art will appreciate that even more additional accumulators 10 may be added to the system with additional parallel connections, each of which may require three more "T" connectors.

A fourth "T" connector 12 may be installed on the output side of the additional accumulator 10, opposite the second supply line 20 side to allow for the installation of a valve 13 and a pressure gauge 11.

During normal gravity operations of the hydraulic system, the return valve 5 and supply valve 6 may both be in the open position. This normal gravity configuration may allow for the flow of hydraulic fluid from the hydraulic components to the hydraulic reservoir 2. During normal gravity operations, hydraulic fluid may travel from the reservoir 2, through the supply valve 6, through the shutoff valve 9, and to a hydraulic device 14. The bleed valve 1 may be in the open position to allow for the normal flow of engine bleed air from the engine bleed line 23 to the hydraulic reservoir 2.

During reduced gravity operations, also referred to as parabolic flight, the bleed valve 1, return valve 5, and supply valve 6 may be moved to a closed position. This reduced gravity operations configuration shuts off the flow of engine bleed air to the reservoir 2 and causes hydraulic fluid returning from hydraulic components to be directed to the additional accumulator 10. This additional accumulator 10 provides for changes in the system volume while keeping fluid and air separated.

One embodiment of the system 100 may include the removal of the reservoir 2. In such an embodiment, the reservoir 2 may be replaced with a "bootstrap" hydraulic reservoir. In this embodiment, the bleed air line 17 would also be removed or permanently closed to prevent fluid communication with the "bootstrap" hydraulic reservoir.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the description of the invention. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. A hydraulic system for use during reduced gravity flight comprising:
   a reservoir;
   a hydraulic device;
   a supply line adapted to provide fluid communication between the reservoir and the hydraulic device;
   a return line adapted to provide fluid communication between the hydraulic device and the reservoir;
   a supply valve located on the supply line between the reservoir and the hydraulic device and selectively configurable in a supply valve open position or a supply valve closed position;
   a return valve located on the return line between the reservoir and the hydraulic device and selectively configurable in a return valve open position or a return valve closed position;
   a second supply line in fluid communication with the return line and the supply line;
   a first accumulator in fluid communication with the supply line; and
   a shutoff valve positioned on the supply line between the first accumulator and the supply valve and also positioned between the second supply line and the first accumulator; and
   wherein the supply valve is adapted to prevent fluid communication between the reservoir and the hydraulic device when in the supply valve closed position; and
   wherein the return valve is adapted to prevent fluid communication between the reservoir and the hydraulic device when in the return valve closed position;
   wherein the second supply line is not in fluid communication with the reservoir when the return valve is in the return valve closed position; and
   wherein the second supply line is not in fluid communication with the reservoir when the supply valve is in the supply valve closed position.

2. The system of claim 1 further comprising:
   a bleed air line adapted to provide fluid communication between an engine bleed line and the reservoir; and
   a bleed valve located on the bleed air line between the reservoir and the engine bleed line and selectively configurable in a bleed valve open position or a bleed valve closed position; and wherein the bleed valve is adapted to prevent fluid communication between the reservoir and the engine bleed line when in the bleed valve closed position.

3. The system of claim 1 wherein the first accumulator is in fluid communication with the second supply line.

4. The system of claim 1 further comprising a second accumulator in fluid communication with the second supply line.

5. The system of claim 1 further comprising:
a return extension line in fluid communication with the return line and the second supply line; and
a supply extension line in fluid communication with the supply line and the second supply line.

6. The system of claim 5 further comprising:
a first connector configured to place the return line in fluid communication with the return extension line;
a second connector configured to place the supply line in fluid communication with the supply extension line; and
a third connector configured to place the return extension line, supply extension line, and second supply line in fluid communication.

7. The system of claim 6 wherein the first accumulator is in fluid communication with the second supply line.

8. A hydraulic system for use during reduced gravity flight comprising:
a reservoir;
a hydraulic device;
an engine bleed line;
a supply line adapted to provide fluid communication between the reservoir and the hydraulic device;
a return line adapted to provide fluid communication between the hydraulic device and the reservoir;
a bleed air line adapted to provide fluid communication between the reservoir and the engine bleed line;
a supply valve located on the supply line between the reservoir and the hydraulic device and selectively configurable in a supply valve open position or a supply valve closed position;
a return valve located on the return line between the reservoir and the hydraulic device and selectively configurable in a return valve open position or a return valve closed position;
a bleed valve located on the bleed air line between the reservoir and the engine bleed line and selectively configurable in a bleed valve open position or a bleed valve closed position;
a second supply line in fluid communication with the return line and the supply line; and
a first accumulator in fluid communication with the supply line; and
wherein the supply valve is adapted to prevent fluid communication between the reservoir and the hydraulic device when in the supply valve closed position;
wherein the return valve is adapted to prevent fluid communication between the reservoir and the hydraulic device when in the return valve closed position;
wherein the bleed valve is adapted to prevent fluid communication between the reservoir and the engine bleed line when in the bleed valve closed position;
wherein the second supply line is not in fluid communication with the reservoir when the return valve is in the return valve closed position;
wherein the second supply line is not in fluid communication with the reservoir when the supply valve is in the supply valve closed position; and wherein a shutoff valve is positioned on the supply line between the first accumulator and the supply valve and between the second supply line and the first accumulator.

9. The system of claim 8 further comprising a second accumulator in fluid communication with the second supply line.

10. The system of claim 8 further comprising:
a return extension line in fluid communication with the return line and the second supply line; and
a supply extension line in fluid communication with the supply line and the second supply line.

11. The system of claim 10 further comprising:
a first connector configured to place the return line in fluid communication with the return extension line;
a second connector configured to place the supply line in fluid communication with the supply extension line; and
a third connector configured to place the return extension line, supply extension line, and second supply line in fluid communication.

12. The system of claim 11 further comprising an accumulator in fluid communication with the second supply line.

13. A hydraulic system for use during reduced gravity flight comprising:
a reservoir;
a hydraulic device;
a supply line adapted to provide fluid communication between the reservoir and the hydraulic device;
a first accumulator in fluid communication with the supply line;
a return line adapted to provide fluid communication between the hydraulic device and the reservoir;
a second supply line in fluid communication with the return line and the supply line;
a return extension line in fluid communication with the return line and the second supply line;
a supply extension line in fluid communication with the supply line and the second supply line;
a second accumulator in fluid communication with the second supply line;
a supply valve located on the supply line between the reservoir and the hydraulic device and selectively configurable in a supply valve open position or a supply valve closed position;
a return valve located on the return line between the reservoir and the hydraulic device and selectively configurable in a return valve open position or a return valve closed position;
a shutoff valve positioned on the supply line between the first accumulator and the supply and between the second supply line and the first accumulator;
a first connector configured to place the return line in fluid communication with the return extension line;
a second connector configured to place the supply line in fluid communication with the supply extension line; and
a third connector configured to place the return extension line, supply extension line, and second supply line in fluid communication; and
wherein the supply valve is adapted to prevent fluid communication between the reservoir and the hydraulic device when in the supply valve closed position;
wherein the return valve is adapted to prevent fluid communication between the reservoir and the hydraulic device when in the return valve closed position;

wherein the second supply line is not in fluid communication with the reservoir when the return valve is in the return valve closed position; and wherein the second supply line is not in fluid communication with the reservoir when the supply valve is in the supply valve closed position.

\* \* \* \* \*